US011105952B2

(12) United States Patent
Millot et al.

(10) Patent No.: US 11,105,952 B2
(45) Date of Patent: Aug. 31, 2021

(54) SYSTEMS AND METHODS FOR DETERMINING THE PRESENCE OF CEMENT BEHIND AT LEAST ONE CASING USING SPECTROSCOPY MEASUREMENT

(71) Applicant: Schlumberger Technology Corporation, Sugar Land, TX (US)

(72) Inventors: Pascal Millot, Kuala Lumpur (MY); Adil Busaidy, Kuala Lumpur (MY); Jeffrey Miles, Arlington, MA (US); Tong Zhou, Sugar Land, TX (US); Christian Stoller, Sugar Land, TX (US); David Rose, Sugar Land, TX (US); Richard Radtke, Pearland, TX (US)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 80 days.

(21) Appl. No.: 16/263,603

(22) Filed: Jan. 31, 2019

(65) Prior Publication Data
US 2019/0235125 A1 Aug. 1, 2019

Related U.S. Application Data

(60) Provisional application No. 62/624,149, filed on Jan. 31, 2018.

(51) Int. Cl.
*G01V 11/00* (2006.01)
*G01V 5/10* (2006.01)
*E21B 47/12* (2012.01)

(52) U.S. Cl.
CPC ............. *G01V 5/102* (2013.01); *E21B 47/12* (2013.01); *G01V 5/104* (2013.01)

(58) Field of Classification Search
CPC ... C04B 28/02; C04B 14/308; C04B 40/0096; C04B 2103/0098; G01V 11/00; G01V 1/44; G01V 5/10; G01V 5/107; G01V 5/145; G01V 11/002; G01V 13/00; G01V 1/40; G01V 3/30; G01V 5/04; G01V 5/08; G01V 5/101; G01V 5/104; G01V 5/102; G01V 2210/66; G01V 5/125; G01V 5/14;
(Continued)

(56) References Cited

U.S. PATENT DOCUMENTS 10,036,828 B2 * 7/2018 Jain .................. G01V 5/101
2012/0080588 A1 * 4/2012 Smith, Jr. ............ G01V 5/101
250/269.6
(Continued)

*Primary Examiner* — Irakli Kiknadze
(74) *Attorney, Agent, or Firm* — Trevor G. Grove

(57) ABSTRACT

A presence of cement may be identified based on a downhole tool that may emit neutrons into a wellbore having at least one cement casing. The neutrons may interact with the particular material via inelastic scattering, inelastic neutron reactions, capture of neutrons and/or neutron activation through one of these reactions and cause a material to emit an energy spectrum of gamma rays, and wherein the downhole tool is configured to detect an energy spectrum of the gamma rays that is specific to at least one of a plurality of elements and associated a region within the wellbore. An amount of elements, such as calcium and silicon, may be determined from the gamma ray spectra that may indicate a present of cement within the wellbore.

20 Claims, 6 Drawing Sheets

(58) Field of Classification Search
CPC .......... G01V 99/005; G01V 8/16; G01V 5/12;
G01V 5/045; G01V 5/105; G01V 5/108;
G01V 1/226; G01V 1/46; G01V 1/50;
G01V 2210/1299; G01V 2210/1429;
E21B 47/005; E21B 47/12; E21B 5/102;
E21B 5/104; E21B 47/00; E21B 47/11;
E21B 33/14; E21B 47/07; E21B 47/135;
E21B 47/002; E21B 43/267; E21B 45/00;
E21B 47/09; E21B 47/14; E21B 49/08;
E21B 47/007; G01N 33/24; G01N
23/203; G01N 21/552; G01N 2201/0218;
G01N 2203/0256; G01N 2291/028; G01N
2291/045; G01N 2291/105; G01N
24/081; G01N 29/024; G01N 29/028;
G01N 29/032; G01N 29/222; G01N
29/223; G01N 29/4472; G01N 21/3504;
G01N 2201/022; G01B 15/02; G06F
17/15; G01T 1/2018; G01T 3/02; G01T
3/06; G01T 1/20; G21K 1/02; G21K
1/025; G21G 4/04; G01F 1/7042
USPC ....................................................... 250/269.6
See application file for complete search history.

(56) References Cited

U.S. PATENT DOCUMENTS

| | | | |
|---|---|---|---|
| 2016/0202387 A1* | 7/2016 | Fox ................. | G01V 11/002 73/152.58 |
| 2016/0273335 A1* | 9/2016 | Quintero ............. | E21B 47/005 |
| 2017/0167243 A1* | 6/2017 | Guo .................. | E21B 47/005 |

* cited by examiner

SYSTEMS AND METHODS FOR DETERMINING THE PRESENCE OF CEMENT BEHIND AT LEAST ONE CASING USING SPECTROSCOPY MEASUREMENT

BACKGROUND

This disclosure relates to evaluating cement behind at least one casing of a wellbore. In particular, this disclosure relates to determining the presence of cement based on data related to the elemental composition of cement, which may reveal the presence or absence of cement even behind multiple casings.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A wellbore drilled into a geological formation may be targeted to produce oil and/or gas from only certain zones of the geological formation. To prevent zones from interacting with one another via the wellbore and to prevent fluids from undesired zones entering the wellbore, the wellbore may be completed by placing a cylindrical casing into the wellbore and cementing the annulus between the casing and the wall of the wellbore. During cementing, cement may be injected into the annulus formed between the cylindrical casing and the geological formation. When the cement properly sets, fluids from one zone of the geological formation may not be able to pass through the wellbore to interact with one another. This desirable condition is referred to as "zonal isolation." Yet well completions may not always go as planned. For example, the cement may not set as planned and/or the quality of the cement may be less than expected. In other cases, the cement may unexpectedly fail to set above a certain depth due to natural fissures in the formation. Moreover, even when well completions occur as desired, it may be desirable to identify a depth of the wellbore where a "top of cement" may be found.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

One embodiment of the present disclosure relates to a method for identifying cement in a wellbore in a geological formation, wherein the wellbore includes at least one casing. The method includes placing a downhole tool into a cased wellbore, and the cased wellbore has been cased using a cement having an elemental composition that includes a plurality of elements. The method also includes emitting neutrons using the downhole tool, wherein the neutrons interact with a particular material via inelastic scattering, inelastic neutron reactions, capture of neutrons, neutron activation, or any combination thereof, through one of these reactions and cause the particular material to emit an energy spectrum of the gamma rays. Further, the method includes detecting, at a first location, a first energy spectrum of the gamma rays that is specific to at least one of the plurality of elements. Even further, the method includes determining a presence of cement at the first location based at least in part on the first energy spectrum.

Another embodiment of the present disclosure relates to a system for identifying cement in a wellbore in a geological formation, wherein the wellbore includes at least one casing. The system includes a downhole tool that may emit neutrons, wherein the neutrons interact with the particular material via inelastic scattering, inelastic neutron reactions, capture of neutrons, neutron activation, or any combination thereof, through one of these reactions and cause a material to emit an energy spectrum of gamma rays, and wherein the downhole tool may detect an energy spectrum of the gamma rays that is specific to at least one of a plurality of elements and associated a region within the wellbore. The system also includes a processor. Further, the system includes a memory storing instructions to be executed by the processor. The instructions include receiving a first energy spectrum of the gamma rays that is specific to calcium associated with a region within the wellbore. Further, the instruction include determining an amount of cement at the region based at least in part on first energy spectrum.

Another embodiment of the present disclosure relates to one or more tangible, non-transitory, machine-readable media having instructions. The instructions cause a processor to receive data indicative of neutrons interacting with a particular material via inelastic scattering, inelastic neutron reactions, capture of neutrons and/or neutron activation through one of these reactions and cause a material to emit an energy spectrum of gamma rays. The instructions also cause the processor to determine a first amount of calcium, silicon, or both based on a first energy spectrum of the gamma rays associated with a first region within a wellbore comprising at least one casing. Further, the instructions cause the processor to determine a second amount of one or more elements based on a second energy spectrum of the gamma rays associated within the first region within the wellbore. Further still, the instructions cause the processor to determine a presence of cement within the first region based at least in part on the first amount and the second amount.

Embodiments of this disclosure relate to a method for identifying cement in a wellbore in a geological formation, wherein the wellbore includes multiple casings, the method includes placing a downhole tool into the cased wellbore, wherein the cased wellbore has been cased using a cement having an elemental composition that includes a plurality of elements. Then, neutrons are emitted using the downhole tool, wherein the neutrons interact with the particular material via inelastic scattering, elastic scattering or capture of neutrons and cause the material to emit an energy spectrum of the gamma rays. Further, the energy spectrum of the gamma rays that is specific to at least one of the plurality of elements is detected. Even further, the presence of cement based on the detected energy spectrum is determined.

Various refinements of the features noted above may be undertaken in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
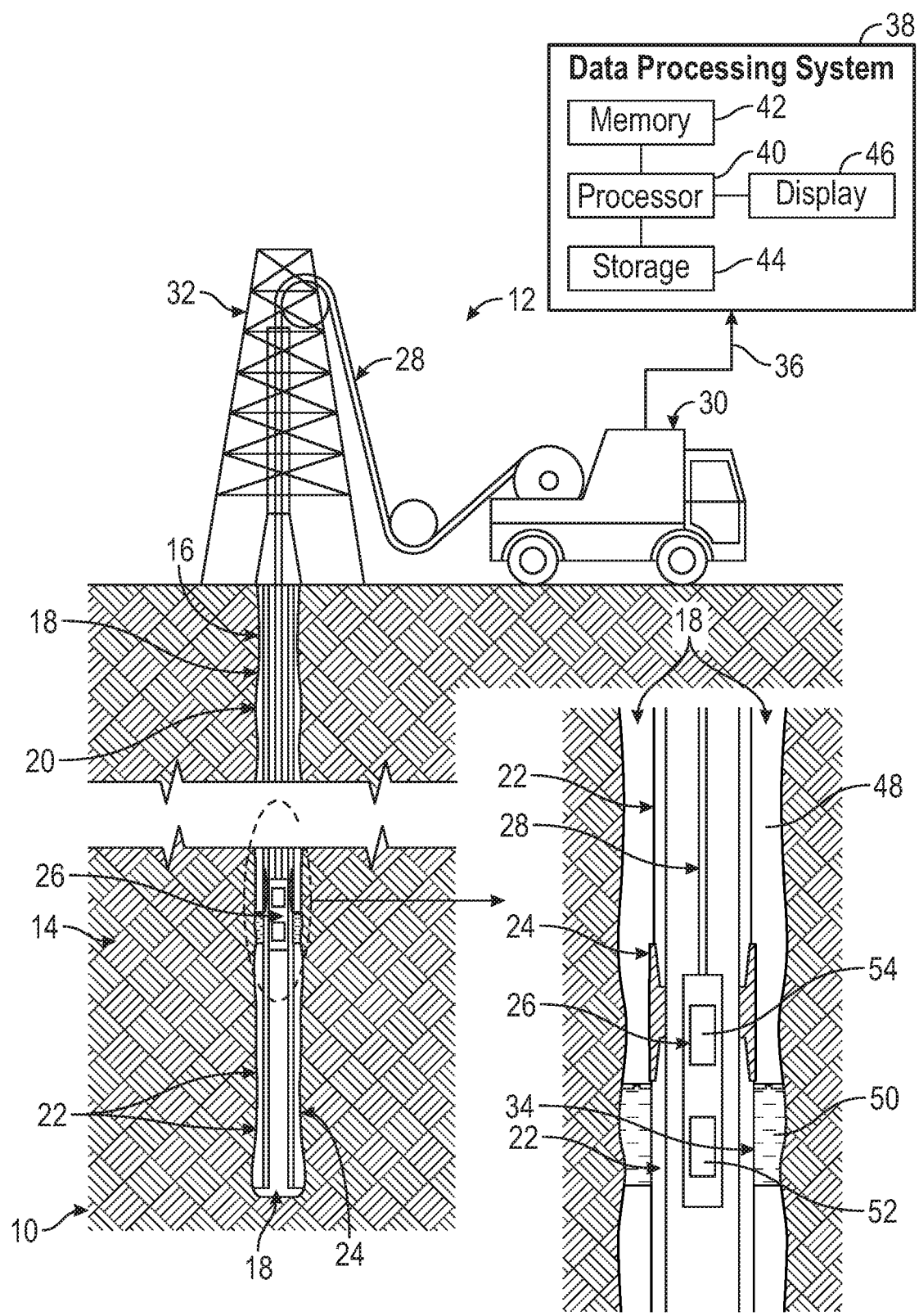
FIG. 1 is a schematic diagram of a system for verifying proper cement installation and/or zonal isolation of a well, in accordance with an embodiment.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

When a well is drilled, metal casing may be installed inside the well and cement placed into the annulus between the casing and the wellbore. When the cement sets, fluids from one zone of the geological formation may not be able to pass through the annulus of the wellbore to interact with another zone. This desirable condition is referred to as "zonal isolation." Proper cement installation may also ensure that the well produces from targeted zones of interest. To verify that the cement has been properly installed and that the cement has remained in a desired state, this disclosure teaches systems and methods for cement evaluation by analyzing well-logging data from a downhole neutron tool (e.g., downhole tool). Namely, the cement may include a concentration of any suitable material—not ordinarily found in that concentration in the materials around the well—that interacts with the neutrons to produce a measurement of radiation signal (e.g., a characteristic radiation) in response. Detecting the characteristic radiation signal using a downhole neutron tool thus may be used to detect the cement.

The term "cement" as defined herein may be defined as the cement slurry poured in the annular space between the casing and the wellbore. The cement may include any suitable cement for cementing operations including hydraulic sealing, zonal isolation, structural casing support, etc. A typical elemental composition of cement includes calcium and oxygen (e.g., between approximately 60 to 70%), and may possibly include silicon. In some embodiments, the cement may include other elements based on the type of cement (e.g., cement with carbonates, silicates, or other metal oxides, such as iron or aluminum). When bombarded by neutrons from a downhole neutron tool, the calcium, or other elements present, may emit gamma-rays through several processes such as neutron capture and inelastic neutron interactions (e.g., inelastic excitation or nuclear reactions). In addition, neutron interactions with the isotopes in the cement may convert isotopes in the cement to (unstable) radioactive isotopes through a process called neutron activation. The emitted gamma rays have a particular energy spectrum that indicates the presence of a particular element. Thus, the characteristic gamma-ray spectrum due to calcium may indicate a presence of cement in beyond the first casing in a well. Some of the elements that are present in cement may also be present in significant quantities in the wellbore environment (e.g., calcium is present in limestone). Thus, in certain embodiments, it may be advantageous to detect elements in addition to or instead of calcium, based on the wellbore environment, to determine the location of the casing. For example, measuring the characteristic gamma-ray spectrum due to silicon or oxygen may supplement or be performed instead of measuring the characteristic gamma-ray spectrum due to calcium.

The present disclosure is directed to techniques for determining the presence of cement behind one or multiple wellbore casings based on the presence and/or absence of elements, such as calcium, that are related to the cement. The identification of cement behind casings is a common requirement in the oil and gas industry. This is typically accomplished by lowering sensing devices (e.g., cement bond logging tools or other acoustic measurement devices) into wellbores and determining the quality and/or quantity of cement behind a first casing. However, existing techniques are often unable to identify and evaluate cement behind concentric sets of casing. As discussed in detail below, the present application shows techniques for determining the presence or absence of cement behind one or multiple wellbore casings based on the gamma-ray spectrum of a wellbore.

With this in mind, FIG. 1 schematically illustrates a system 10 for evaluating cement behind casing in a well. In particular, FIG. 1 illustrates surface equipment 12 above a geological formation 14. In the example of FIG. 1, a drilling operation has previously been carried out to drill a wellbore 16. In addition, an annular fill 18 (e.g., cement) has been used to seal an annulus 20—the space between the wellbore 16 and casing joints 22 and collars 24—with cementing operations.

As seen in FIG. 1, several casing joints 22 (also referred to below as casing 22) are coupled together by the casing collars 24 to stabilize the wellbore 16. Coupled in this way, the casing joints 22 may be assembled to form a casing string to a suitable length and specification for the wellbore 16. The casing joints 22 and/or collars 24 may be made of carbon steel, stainless steel, or other suitable materials to withstand a variety of forces, such as collapse, burst, and tensile failure, as well as chemically aggressive fluid.

The surface equipment 12 may carry out various well logging operations to detect conditions of the wellbore 16. The well logging operations may measure parameters of the geological formation 14 (e.g., resistivity or porosity) and/or the wellbore 16 (e.g., temperature, pressure, fluid type, or fluid flowrate). Other measurements may provide well-logging data relating to cement characteristics (e.g., measurements of characteristic radiation emitted by a material in the cement of the annular fill 18, such as the calcium or silicon present in the cement, in response to neutrons emitted from one or more neutron generators disposed in a downhole neutron tool) that may be used to verify the cement installation and the zonal isolation of the wellbore 16. One or more downhole neutron tools 26 may obtain some of these measurements.

The example of FIG. 1 shows the downhole neutron tool 26 being conveyed through the wellbore 16 by a cable 28. Such a cable 28 may be a mechanical cable, an electrical cable, or an electro-optical cable that includes a fiber line protected against the harsh environment of the wellbore 16. In other examples, however, the downhole neutron tool 26 may be conveyed using any other suitable conveyance, such as coiled tubing. The downhole neutron tool 26 may be used to obtain measurements of radiation emitted by a material (e.g., the calcium or silicon present in the cement) in response to neutrons emitted from a neutron generator—52 or a radioisotopic neutron source disposed in the tool 26. The downhole neutron tool 26 may include one or more radiation detectors 54. The radiation detectors 54 may detect neutrons that scatter and return to the downhole neutron tool 26 and/or gamma rays generated from neutron interactions. The radiation detectors 54 may be placed at various distances from the neutron generator 52 to gather data about the neutrons and/or gamma rays at various depths of investigation (e.g., near, medium, deep) as explained further below. The data gathered by the radiation detectors 54 may be analyzed in order to obtain a number of neutron induced inelastic or capture gamma rays or thermal neutrons due to neutron interactions with the material (e.g., elements in the cement). The data may then be used to determine the amount of the material present surrounding the wellbore to subsequently determine the presence or absence of cement. Still further, the data may be used to determine the thickness of the cement over the depth of the well at various depths based in part on the data (e.g., the detected radiation, number of neutron capture gamma rays, etc.).

The downhole neutron tool 26 may be deployed inside the wellbore 16 by the surface equipment 12, which may include a vehicle 30 and a deploying system such as a drilling rig 32. Data related to the geological formation 14 or the wellbore 16 gathered by the downhole neutron tool 26 may be transmitted to the surface, and/or stored in the downhole neutron tool 26 for later processing and analysis. The vehicle 30 may be fitted with or may communicate with a computer and software to perform data collection and analysis.

FIG. 1 also schematically illustrates a magnified view of a portion of the cased wellbore 16. As mentioned above, the downhole neutron tool 26 may obtain well-logging data relating to the presence of the cement in the annular fill 18 behind the casing 22. For instance, the downhole neutron tool 26 may obtain measures of well-logging data, which may be used to determine where the material behind the casing 22 is fully cemented or at least partly washed out. When the downhole neutron tool 26 provides such measurements to the surface equipment 12 (e.g., through the cable 28), the surface equipment 12 may pass the measurements as well-logging data 36 to a data processing system 38 that includes a processor 40, memory 42, storage 44, and/or a display 46. In other examples, the well-logging data 36 may be processed by a similar data processing system 38 at any other suitable location. The processor 40 may execute instructions stored in the memory 42 and/or storage 44. As such, the memory 42 and/or the storage 44 of the data processing system 38 may be any suitable article of manufacture that can store the instructions. The memory 42 and/or the storage 44 may be ROM memory, random-access memory (RAM), flash memory, an optical storage medium, or a hard disk drive, to name a few examples. The display 46 may be any suitable electronic display that can display the logs and/or other information relating to classifying the material in the annulus 20 behind the casing 22.

In this way, the well-logging data 36 from the downhole neutron tool 26 may be used to determine whether cement of the annular fill 18 has been installed as expected. In some cases, the well-logging data 36 may indicate that the cement of the annular fill 18 is present, as indicated by the presence of the expected radiation caused by neutron interactions with the cement (e.g., characteristic neutron-capture gamma rays, or "capture gamma-rays" from calcium or silicon in the cement). In other cases, the well-logging data 36 may indicate the potential absence of cement in the annular fill 18 (e.g., as indicated by region 50), as indicated by the absence or reduction of the expected radiation caused by neutron interactions with the cement. For example, when the well-logging data 36 indicates that the annular fill 18 lacks the radiation that is expected to be detected when the cement is present, this may imply that the cement is either absent or was of the wrong type or consistency, and/or that fluid channels have formed in the cement of the annular fill 18. The well-logging data 36 may also be used to determine the thickness of the cement in the annular space. For example, the thickness of the annular fill 18 may utilize pre-fill measurements taken via calipers or other suitable tools to measure the wellbore thickness. The pre-fill measurements may then be compared to post-fill measurements after the annular space is filled with cement. The pre-fill and post-fill measurements may be used to determine whether the thickness of the cement is a suitable thickness, detect abnormalities in the cement, and/or adjust the cementing operations.

Figure 2:
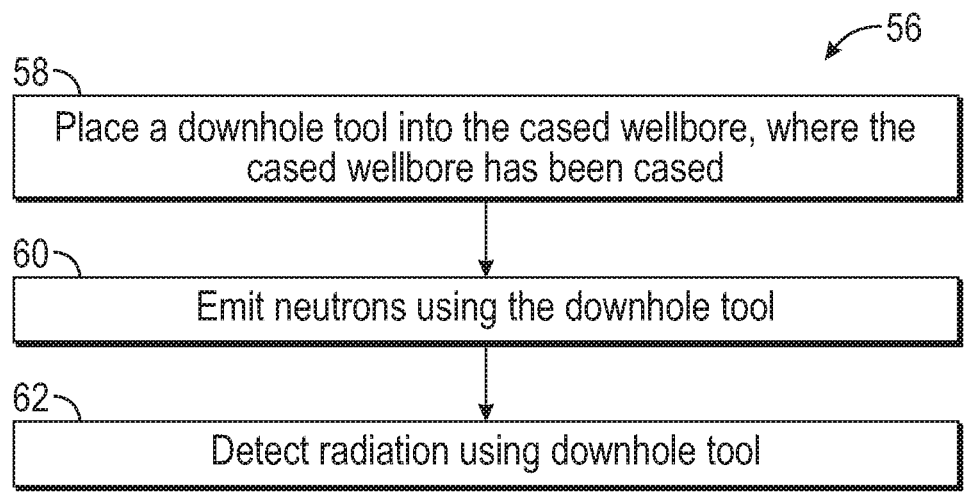
FIG. 2 shows a flow chart of a method for evaluating cement in the cased wellbore in the geological formation, in accordance with an embodiment.

FIG. 2 illustrates a flow chart 56 of a cement evaluation method for evaluating cement in the cased wellbore 16 in the geological formation 14, in accordance with an embodiment. The flow chart 56 may include positioning (block 58) the downhole neutron tool 26 into the cased wellbore 16. As described above, the cased wellbore 16 may be cased with cement. The cement may emit a characteristic gamma ray spectrum when or after having been bombarded with neutrons, which is distinct from that of the surrounding geological formation 14. The gamma ray spectrum may be used to determine the absence or presence of cement, as explained further below. In some embodiments, the gamma ray spectrum may be used to determine the height of the annular fill, which may be referred to as a "top of cement" in the wellbore.

The flow chart 56 may include using a neutron generator 52 disposed in the downhole neutron tool 26 to emit (block 60) neutrons. The emitted neutrons may interact with the material and cause the material to emit a radiation (e.g., a spectrum of gamma rays associated with the material, a die-away pattern of the gamma rays or neutrons) due to high energy (inelastic, referred to as "inelastic gamma-rays"), epithermal or thermal neutron interactions. For example, inelastic scattering or neutron capture gamma rays may be emitted by the material in the cement (e.g., inelastic gamma-rays, capture gamma-rays). These gamma rays may be identifiable as deriving from the material in the cement, as opposed to other downhole materials. For example, the material (e.g., calcium or silicon) may be less likely to be found in the geological formation 14 or may be found in a different concentration in the geological formation 14 than in the cement (e.g., the material may be found in a low enough concentration in the geological formation 14 to distinguish the cement from the geological formation 14). Moreover, since inelastic and capture response may not have the same depth of investigation, comparison of the two responses may identify the presence of cement even when the formation contains the same elements as the cement. For example, the radiation from silicon, which exhibits both inelastic gamma-ray emission and neutron activation gamma-ray emission, may be used to determine the presence of gravel behind a casing in addition to using the radiation from calcium, or alone.

The flow chart 56 may include using a radiation detector 54 to detect (block 62) well-logging data, such as the characteristic radiation associated with the material (e.g., elements present in cement, such as calcium or silicon). The well-logging data may then be used to determine the type and/or amount of the material present surrounding the wellbore to subsequently determine the presence or absence of cement and/or the thickness of the cement.

In some embodiments, the downhole neutron tool 26 may include multiple radiation detectors 54. For example, a near detector that collects radiation of one range of depth of investigation and a far detector that collections radiation of a second range of depth of investigation. The capture gamma-rays and the inelastic gamma-rays detected by the detector result in a capture spectrum and an inelastic spectrum, respectively. From these spectra (e.g., the capture spectrum and the inelastic spectrum), the presence of an element (e.g., calcium) may be determined. Moreover, a quantitative amount of the element(s) may be inferred based on the gamma-rays detected by the detector. The cement volume may be inferred from the spectral yields directly, including from the capture or inelastic yields individually, or via a combination of the two spectra. The cement may also contain other elements, for example silicon, whose yields or weight concentrations can be used for cement evaluation.

In some embodiments, the flow chart 56 may be performed in a quantitative fashion, converting the yields or concentrations into a volume of cement through the use of an algorithm. In addition to the elemental measurements, such an algorithm may require inputs for various environmental properties from a list that includes but is not limited to casing size, casing weight, bit size, borehole diameter, borehole fluid type or density, and expected properties of the cement including composition and density. In other embodiments, the flow chart 56 may be performed in a qualitative fashion, with the goal of flagging a significant deficit of cement volume or finding a top-of-cement depth.

Figure 3:
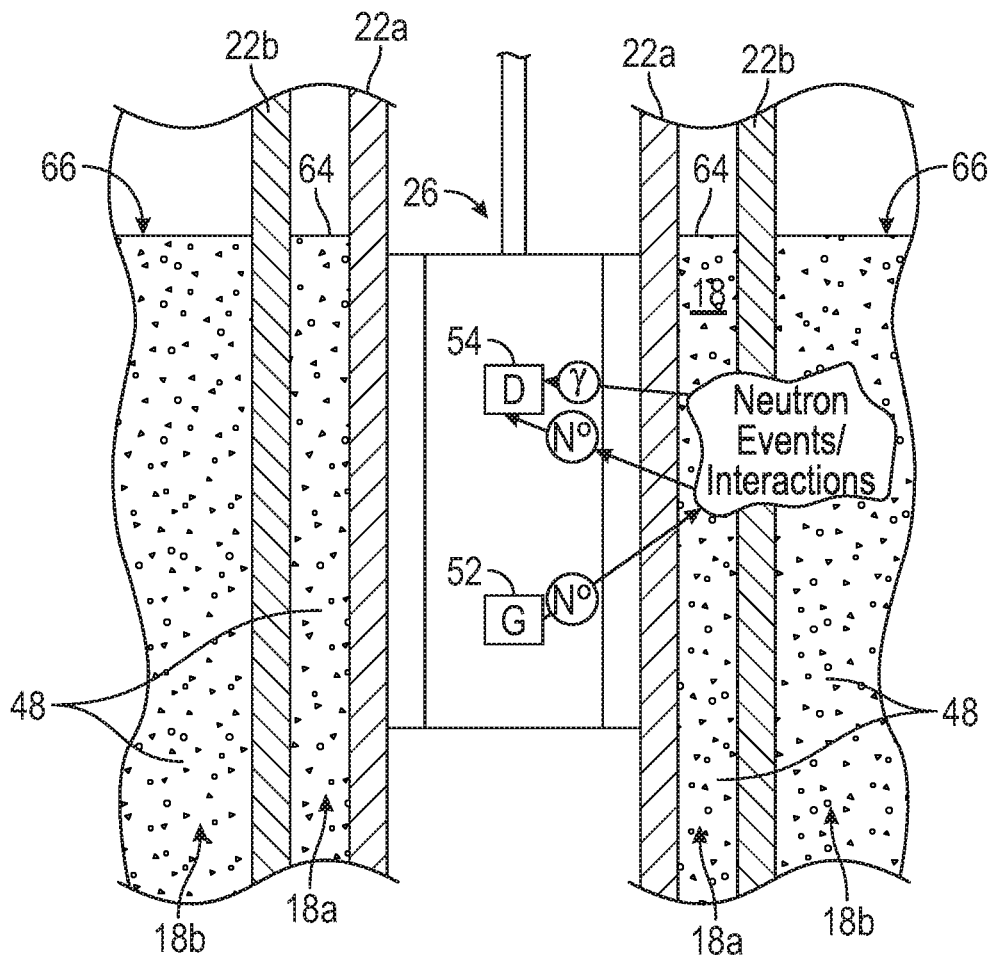
FIG. 3 is a schematic illustration of a downhole tool (e.g., a downhole neutron tool) used to obtain well-logging data relating to material behind multiple casings of the well, in accordance with an embodiment.

FIG. 3 is a schematic illustration of the downhole neutron tool 26 used to obtain well-logging data relating to material behind casing 22 of the well, in accordance with an embodiment. Specifically, a neutron source (e.g., the neutron generator 52) in the downhole neutron tool 26 may emit neutrons out toward the casing 22. The neutrons may be transported to interfaces at the casing 22, the annular fill 18, and the geological formation 14 or an outer casing, respectively. The interactions (e.g., elastic and inelastic collisions, capture, etc.) of the neutrons may vary depending on whether the annular fill 18 is cement 48 or not cement (e.g., region 50). For example, region 50 may include a material with an elemental composition, density, and other properties that are different than cement 48. Indeed, even if the annular fill 18 is not solid cement, the region 50 may be of the generally liquid or gas character but containing cement (detectable via the characteristic behavior of the cement when interacting with neutrons), the annular fill 18 is likely to set into the solid cement 48 in time. The neutron generator 52 may be used for time-based measurements (e.g., using a pulsed neutron generator) and/or energy-based measurements (e.g., using a radioisotope source, a pulsed neutron generator, etc.). The radiation detector 54 may be a gamma-ray and/or a neutron detector that may detect the radiation that results from these neutron interactions. The downhole neutron tool 26 may use any suitable number of different data analysis techniques, including utilizing measurements of the detected radiation, number of neutron capture gamma rays, etc. Various measurements obtained at the same depth in the wellbore 16 may be correlated to gain insight into the properties of the material behind the casing 22.

As illustrated FIG. 3, the wellbore 16 includes two concentric casings 22a and 22b, and casing is surrounded by an annular fill 18a and 18b that are at a height 64 and 66, respectively. The height 64 is equal to height 66 and each annular fil 18a and 18b include a region 50 above the respective heights 64 and 66 that indicates an absence of cement. As such, the radiation detector 54 may determine a signal indicative of the top of the cement as the downhole neutron tool 26 moves passes the heights 64 and 66. Specifically, below the heights 64 and 66, the downhole neutron tool 26 may receive gamma-rays indicative of cement, and receive little to no gamma-rays indicative cement as the downhole neutron tool 26 detects the region 50 during the flow chart 56. In some embodiments, the signal may indicate the height, or approximate height, of the annular fill 18b. In some embodiments, the wellbore 16 may include more than two casings.

Figure 4:
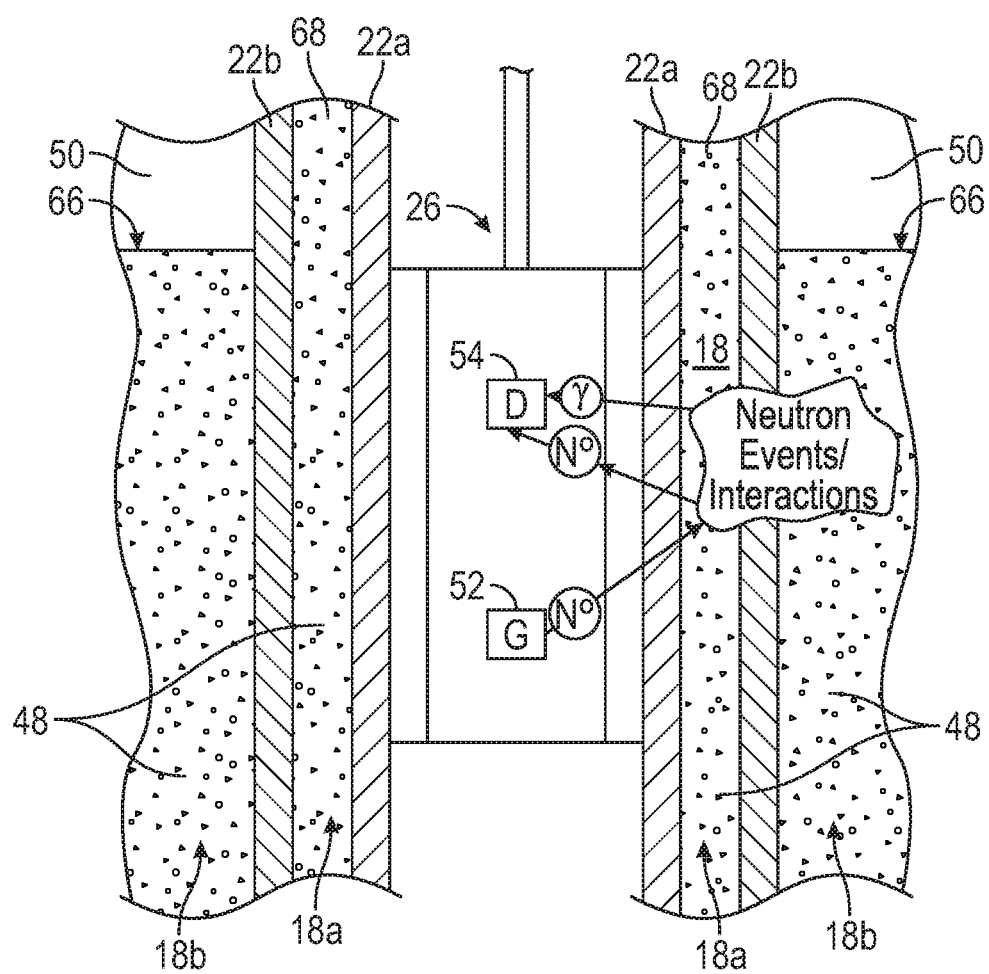
FIG. 4 is a schematic illustration of a downhole tool (e.g., a downhole neutron tool) used to obtain well-logging data relating to material behind multiple casings of the well, in accordance with an embodiment.

FIG. 4 is a schematic illustration of the downhole neutron tool 26 used to obtain well-logging data relating to material behind casing 22 of the well, in accordance with an embodiment. Specifically, a neutron source (e.g., the neutron generator 52) in the downhole neutron tool 26 may emit neutrons out toward the casing 22. The neutrons may be transported to interfaces at the casing 22, the annular fill 18, and the geological formation 14 or an outer casing, respectively. The interactions (e.g., elastic and inelastic collisions, capture, etc.) of the neutrons may vary depending on whether the annular fill 18 is of the generally solid cement 48 not cement (e.g., region 50). The neutron generator 52 may be used for time-based measurements (e.g., using a pulsed neutron generator) and/or energy-based measurements (e.g., using a radioisotope source, a pulsed neutron generator, etc.). The radiation detector 54 may be a gamma-ray and/or a neutron detector that may detect the radiation that results from these neutron interactions. The downhole neutron tool 26 may use any suitable number of different data analysis techniques, including utilizing measurements of the detected radiation, number of neutron capture gamma rays, etc. Various measurements obtained at the same depth in the wellbore 16 may be correlated to gain insight into the properties of the material behind the casing 22.

As illustrated in FIG. 4, the wellbore 16 includes two concentric casings 22a and 22b, and the casings 22a and 22b are surrounded by an annular fill 18a and 18b containing cement 48 that are at a height 66 and 68, respectively. The height 68 is greater than the height 66; thus, there is less cement outside of the casing 22b (e.g., indicated by region 50). As such, the radiation detector 54 may determine a signal indicative of the absence of cement above the height 66 (e.g., based on a decreased gamma-ray signal) during the flow chart 56. In some embodiments, the signal may be sensitive enough to indicate the height, or approximate height, of the annular fill 18b. In some embodiments, the wellbore 16 may include more than two casings.

Figure 5:
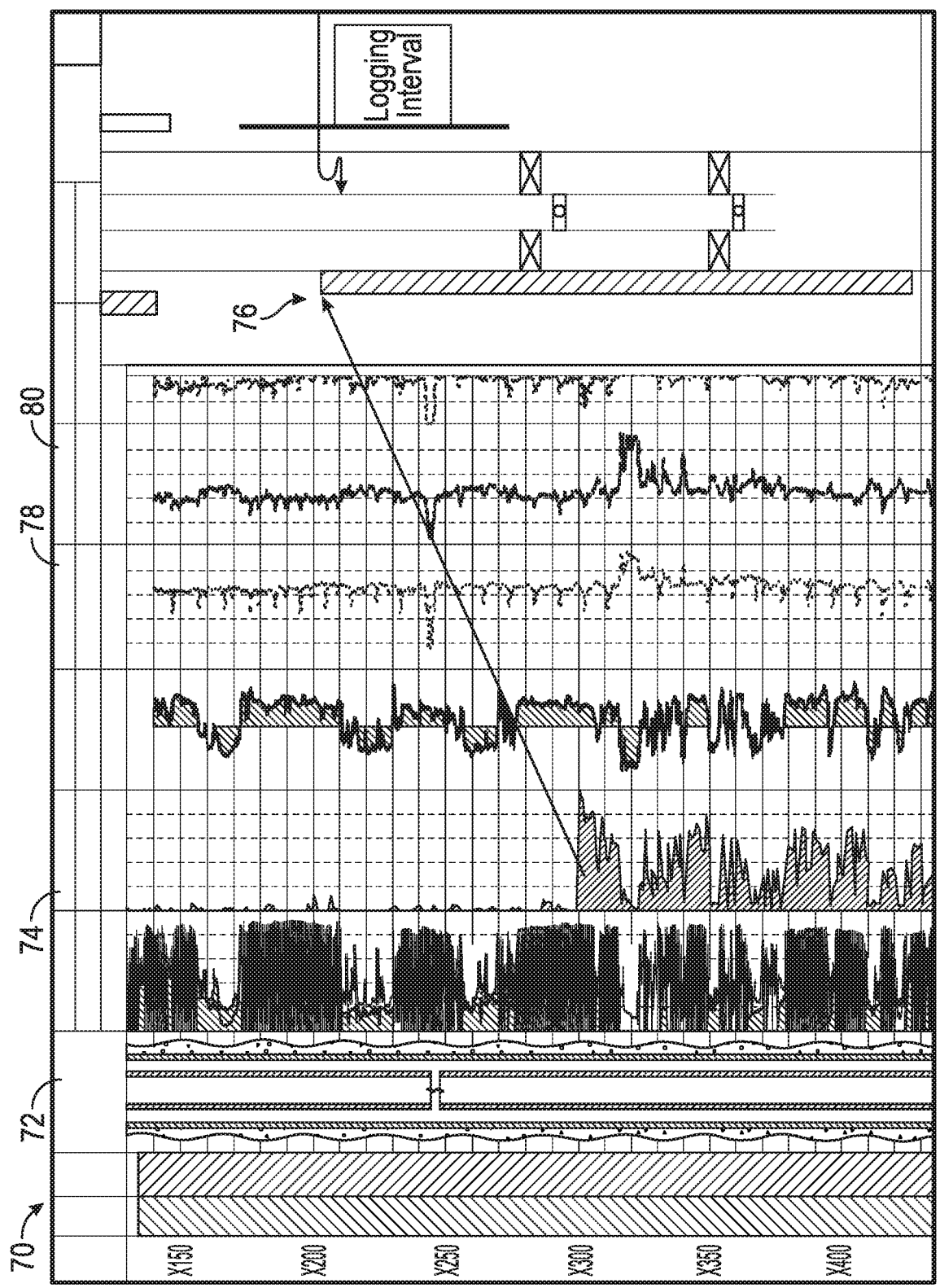
FIG. 5 shows well-logging data obtained from a downhole tool, in accordance with an embodiment.

FIG. 5 shows logging data 70 recorded using the downhole neutron tool 26 in a wellbore with multiple casings. Column 72 shows an illustration of the wellbore 16 and column 74 represents the dry weight of calcium calculated from characteristic gamma-ray spectrum of calcium. Based on either a calibration standard or known casing dimensions, the dry weight of calcium may be determined (e.g., a larger distance between casings might result in an annular fill 18 with a larger radius, thus increasing the amount of calcium that would be detected by the detector). In column 74, the dry weight calcium goes from 0% to between 1% and 15% as the top of the cement is crossed. This region is identified by the arrow 76 on the well diagram at approximately the same depth. The logging data 70 also includes columns that represent data obtained from the near detector and far detector (e.g., column 78) and data obtained from the near detector and deep detector (e.g., column 80). In some embodiments, this data may be used in generating quantitative data related to the amount of cement present. For example, given a depth of investigation by the downhole neutron tool of approximately 11 inches for the capture spectrum and approximately 6 inches for the inelastic spectrum, the limit of detection of calcium may be approximately 4.5 inches. Moreover, two or more spectra may be recorded by a detector, wherein the depth of investigation for the two spectra is different. For example, a detector may record a net inelastic spectrum, an early capture spectrum, a late capture spectrum, an activation spectrum, or any combination thereof. For example, in a gauge 6⅛-inch hole cased in a 4½ inch casing, the dry weight of cement may represent approximately 1.6% from the volume investigated by the inelastic spectrum and 5.6% from the capture spectrum. It would be appreciated by one of ordinary skill in the art that the total investigated volume of inelastic emissions may be smaller than the volume of capture emissions, and further, may be different that the volume of activation emissions. For example, certain elements (e.g., Calcium) may not emit a significant activation spectrum. Thus, in some embodiments, it may be desirable to use both or one of the spectra (e.g., the inelastic spectrum and the capture spectrum) to refine any quantitative determinations of the amount of cement. Further, the cement may contain other elements (e.g., silicon) whose yields or weight concentrations may be used to cement evaluation (e.g., qualitative or quantitative determination of cement). Moreover, the spectral shape of the spectrum (e.g., inelastic spectrum, capture spectrum, or activation spectrum) may provide an indication of the depth from which the gamma rays are being emitted.

Figure 6:
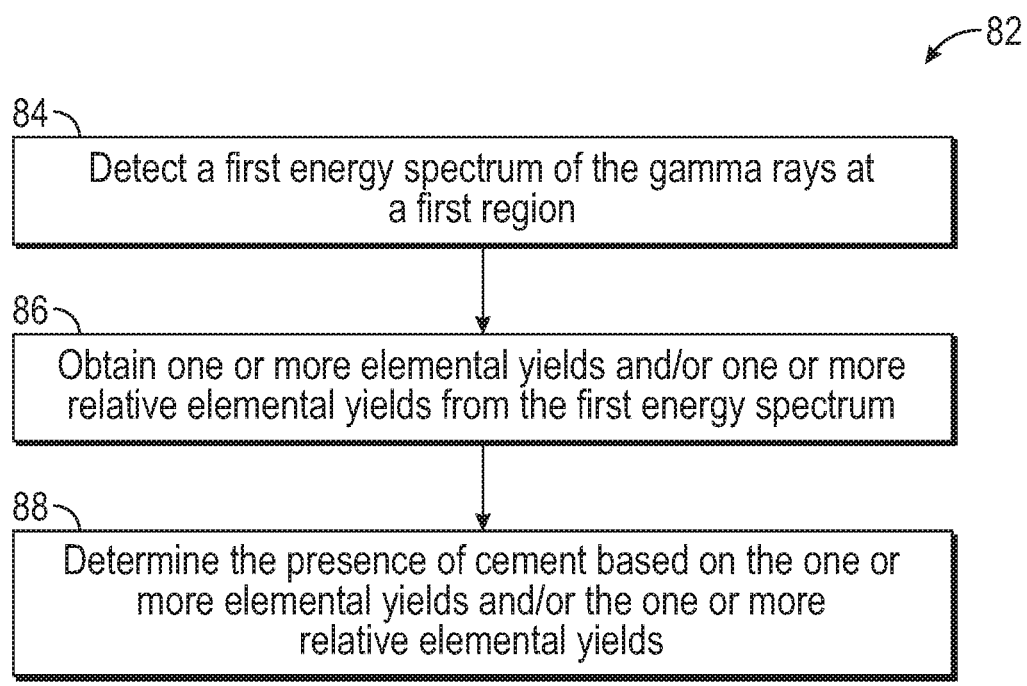
FIG. 6 is a flow chart of a process for identifying cement in a wellbore in a geological formation.

In accordance with the techniques discussed herein, FIG. 6 shows a flow chart 82 for determining an amount or presence of cement within a wellbore. In general, the flow chart 82 shows a method for determining an amount or presence of cement based on elemental spectroscopy measurements received by at least one detector 54 of a downhole neutron tool 26. The elements illustrated in the flow chart 82 may be performed by the data processing system 38 or any suitable processing system. It should be appreciated that the steps of the flow chart 82 may be performed in addition to or in combination with one or more steps of the flow chart 56 shown in FIG. 2.

The flow chart 82 may include detecting (process block 84) a first energy spectrum of the gamma rays at a first region. In some embodiments, the first energy spectrum may include a spectrum indicative of one or more elements over one or more ranges of energies. For example, the spectrum or spectra may include elements typically found in cement, elements not typically found in cement, or elements known to be present in the formation, or any combination thereof. In some embodiments, the spectrum or spectra may be indicative of certain dopants in the cement, such as those that may provide higher signals with gamma-ray spectroscopy and/or elements that are less likely to be found in the formation. In some embodiments, the first energy spectrum may be obtained by a downhole neutron tool 26 having one detector 54. In some embodiments, the first energy spectrum may be obtained by a downhole neutron tool 26 having multiple detectors 54.

The flow chart 82 may also include obtaining (process block 86) one or more elemental yields and/or one or more relative elemental yields from the first energy spectrum. In some embodiments, obtaining the elemental yield may include determining a mass and/or volume associated with each element from the detected energy spectrum (e.g., from process block 84). Moreover, the element yields may be determined directly from each spectrum for each element or based on a calibration data. In some embodiments, relative yields, which are a percentage of gamma ray counts generated from individual elements over the total gamma ray counts, a ratio between two elements, and/or a percentage, may be obtained. Additionally, the flow chart 82 may include determining (process block 88) the presence of cement based on the one or more elemental yields and/or the one or more relative elemental yields.

Figure 7:
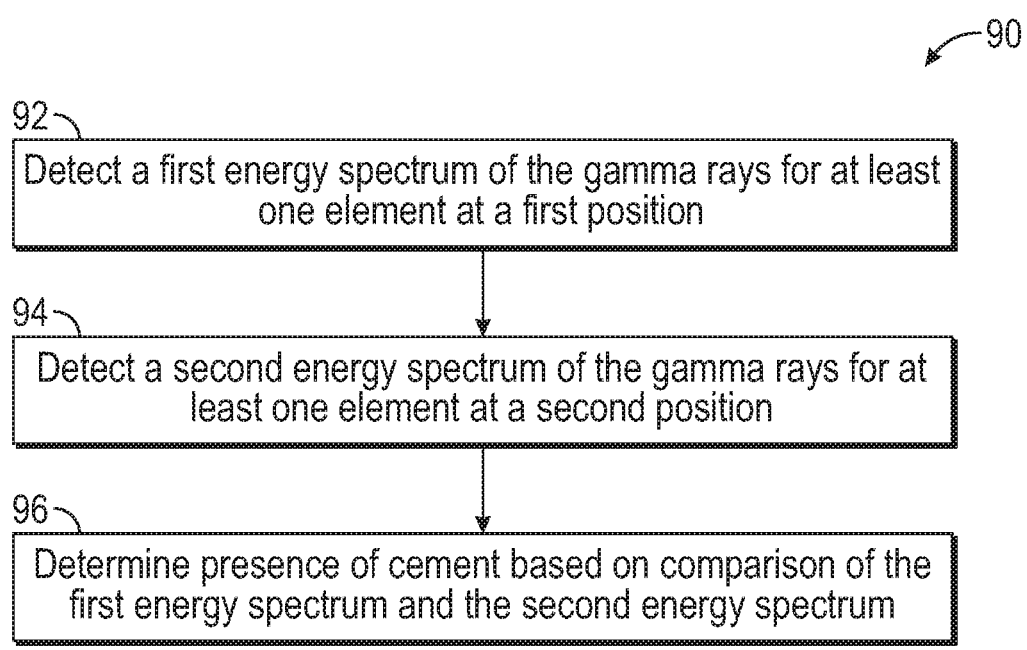
FIG. 7 is an additional flow chart of a process for identifying cement in a wellbore in a geological formation.

In some embodiments, cement may be determined based on a combination and/or comparison of multiple detected spectra. For example, an energy spectrum at one region within a wellbore may be compared to another energy spectrum at another region in a wellbore. The two energy spectra may be obtained by, for example, a downhole neutron tool 26 having multiple detectors 54 in different positions and/or that measure different depths of investigation, or the two energy spectra may be obtained by moving the downhole neutron tool 26 having one or multiple detectors 54. Moreover, the detectors may measure gamma rays resulting from different interactions between neutrons and a formation, as discussed herein. In any case, FIG. 7 shows a flow chart 90 for determining an amount or presence of cement within a wellbore. The elements illustrated in the flow chart 90 may be performed by the data processing system 38 or any suitable processing system. It should be appreciated that the steps of the flow chart 90 may be performed in addition to or in combination with one or more steps of the flow chart 56 shown in FIG. 2 and/or the flow chart 82 shown in FIG. 6.

The flow chart 90 may include detecting (process block 92) a first energy spectrum of gamma rays for at least one element at a first position. For example, as discussed herein, this may include detecting a spectrum indicative of elements that may be found in cement (e.g., silicon and/or calcium). In some embodiments, detecting the first energy spectrum of gamma rays for at least one element at a first position may include determining an amount (e.g., a concentration, a mass, a volume, etc.) of the at least one element at the first position. As discussed herein, the first position is generally a location and/or region within the wellbore, such as along the annular fill 18 behind a casing 22.

The flow chart 90 may also include detecting (process block 94) a second energy spectrum of the gamma rays for at least one element at a second position. In some embodiments, the second position and the first position may be the same position. As such, the difference between detecting the first energy spectrum and the second energy spectrum may be that different elements are detected for each spectrum. For example, the first energy spectrum may include one or more elements typically found in cement, while the second energy spectrum may include one or more elements not typically found in cement. Alternatively, the first energy spectrum may include one subset of one or more elements found in cement and the second energy spectrum may include a second subset of one or more elements found in cement. As such, the relatively proportions of these elements may be indicative of whether or not cement is present. In some embodiments, the second position may be at a different depth along a wellbore and/or a different depth of investigation (DOI) within the wellbore that may be associated with either a different annular fill (e.g., 18a or 18b as shown in FIG. 3), or both. As discussed above, with respect to process block 92, detecting the second energy spectrum of gamma rays for at least one element at a second position may include determining an amount of at least one element at the second position. It should be appreciated that in some embodiments, the first position and the second positions may be detected by a downhole neutron tool 26 having either a single detector or multiple detectors, as discussed herein.

The flow chart 90 may also include determining (process block 96) a presence of cement based on a comparison of the first energy spectrum and the second energy spectrum. For example, the comparison may be a comparison of the magnitude of one or more signals from the first energy spectrum between one or more signals from the second energy spectrum. In such embodiments where multiple elements are detected at a position, the multiple spectra may be represented as a ratio between combinations of the elements detected at each position. It should be appreciated that a ratio of multiple elements may change between a region of cement and a region other than cement. Additionally or alternatively, multiple spectra indicative of multiple elements may be recorded at multiple locations. Each spectra for each location may be compared to determine a presence or absence of cement (e.g., indicative of a top of an annular fill 18. While in some embodiments, the multiple locations may be detected by a downhole neutron tool 26 having multiple detectors, it should also be appreciated that multiple locations may be detected by moving the downhole neutron tool 26 to a different depth within the wellbore. Further, the location may be a different depth of the investigation and the detected elemental spectrum or spectra from the different depth of investigation may be detected as discussed herein.

As one non-limiting example, a wellbore may be disposed in a formation having a relatively larger amount of one or more elements that are not typically found in cement than an element that is present in cement. As such, a ratio of elements present in the cement (e.g., silicon and/or calcium) versus elements that may not be present in the cement may differ between a region associated with an annular fill having cement and a region that does not have cement. As such, an operator of the downhole neutron tool 26 may determine where cement is located (e.g., a location of the top of annular fill) in the one or more casings within the wellbore. Put differently, a region investigated by a downhole neutron tool 26 that does not contain cement will have a larger amount of elements not found in cement. Additionally or alternatively, the operator may compare the detected amounts for each element as a function of depth in the wellbore to determine the presence of cement, such as a porous region of cement, any holes, the top of the annular fill, and the like.

In some embodiments, determining (process block 88) a presence of cement may include a quantitative amount of the element(s) that may be inferred based on the gamma-rays detected by the detector. The cement volume may be inferred from the spectral yields directly, including from the capture or inelastic yields individually, or via a combination of the two spectra. The cement may also contain other elements, for example silicon, whose yields or weight concentrations can be used for cement evaluation.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The invention claimed is:

1. A method for identifying cement in a cased wellbore in a geological formation, wherein the cased wellbore includes at least one casing, the method comprising:
   placing a downhole tool into a cased wellbore, wherein the cased wellbore has been cased using a cement having an elemental composition that includes a plurality of elements;
   emitting neutrons using the downhole tool, wherein the neutrons interact with a particular material via inelastic scattering, inelastic neutron reactions, capture of neutrons, neutron activation, or any combination thereof, through one of these reactions and cause the particular material to emit an energy spectrum of gamma rays;
   detecting, at a first location, a first energy spectrum of the gamma rays that is specific to at least one of the plurality of elements; and
   determining a presence of cement at the first location based at least in part on the first energy spectrum.

2. The method of claim 1, wherein the presence of cement is a volume of cement determined based at least in part on a combination of an inelastic spectrum and a capture spectrum indicative of calcium.

3. The method of claim 1, wherein the at least one of the plurality of elements comprises calcium.

4. The method of claim 1, comprising:
   detecting, at a second location, a second energy spectrum of the gamma rays that is specific to the at least one of the plurality of elements; and determining presence of cement at the first location based at least in part on the first energy spectrum, and the second energy spectrum.

5. The method of claim 1, wherein the first energy spectrum of the gamma rays is specific to at least two of the plurality of elements; and
determining the presence of cement at the first location based at least in part on at least one ratio of elements from the at least two of the plurality of elements.

6. The method of claim 1, wherein the presence is associated with a region of an annular fill between at least one casing.

7. The method of claim 1, comprising determining a depth within the cased wellbore based at least in part on a shape of a peak related to an element of the first energy spectrum and the presence of cement.

8. The method of claim 1, wherein the first location is a first depth in the cased wellbore.

9. A system for identifying cement in a cased wellbore in a geological formation, wherein the cased wellbore includes at least one casing, comprising:
a downhole tool configured to emit neutrons, wherein the neutrons interact with a particular material via inelastic scattering, inelastic neutron reactions, capture of neutrons, neutron activation, or any combination thereof, through one of these reactions and cause the particular material to emit an energy spectrum of gamma rays, and wherein the downhole tool is configured to detect an energy spectrum of the gamma rays that is specific to at least one of a plurality of elements associated with a region within the cased wellbore;
a processor; and
a memory storing instructions configured to be executed by the processor, the instructions comprising instructions to:
receive a first energy spectrum of the gamma rays that is specific to calcium associated with a region within the cased wellbore; and
determine an amount of cement at the region based at least in part on the first energy spectrum.

10. The system of claim 9, wherein the instructions comprise:
receive a second energy spectrum of the gamma rays that is specific to one or more elements not including calcium associated with the region within the cased wellbore; and
determine the amount of cement at the region based at least in part on the first energy spectrum and the second energy spectrum.

11. The system of claim 10, wherein the instructions comprise:
receive a third energy spectrum of the gamma rays that is specific to one or more elements associated with an additional region within the cased wellbore;
determine an additional amount of cement at the additional region based at least in part on a comparison between the first energy spectrum, the second energy spectrum, and the third energy spectrum.

12. The system of claim 11, wherein the region and the additional region are at different depths of investigation.

13. The system of claim 11, wherein the instructions comprise identifying an absence of cement in the region, the additional region, or both, based on the amount.

14. The system of claim 13, wherein the identified absence of cement in the region, comprises a depth within the cased wellbore associated with the region.

15. The system of claim 9, wherein the region is associated with a region of an annular fill between at least one casing.

16. The system of claim 9, wherein the amount of cement is determined based on a combination of an inelastic spectrum and a capture spectrum indicative of calcium.

17. One or more tangible, non-transitory, machine-readable media comprising instructions configured to cause a processor to:
receive data indicative of neutrons interacting with a particular material via inelastic scattering, inelastic neutron reactions, capture of neutrons and/or neutron activation through one of these reactions and cause the particular material to emit an energy spectrum of gamma rays;
determine a first amount of calcium, silicon, or both based on a first energy spectrum of the gamma rays associated with a first region within a cased wellbore comprising at least one casing;
determine a second amount of one or more elements based on a second energy spectrum of the gamma rays associated with the first region within the cased wellbore; and
determine a presence of cement within the first region based at least in part on the first amount and the second amount.

18. The one or more machine-readable media of claim 17, wherein the first amount is associated with a first depth of investigation within the first region, the second amount is associated with a second depth of investigation within the first region.

19. The one or more machine-readable media of claim 18, wherein the second amount of the one or more elements does not include an amount of calcium, silicon, or both.

20. The one or more machine-readable media of claim 17, where the instructions comprise:
determine a depth within the cased wellbore lacking cement.

* * * * *